UNITED STATES PATENT OFFICE.

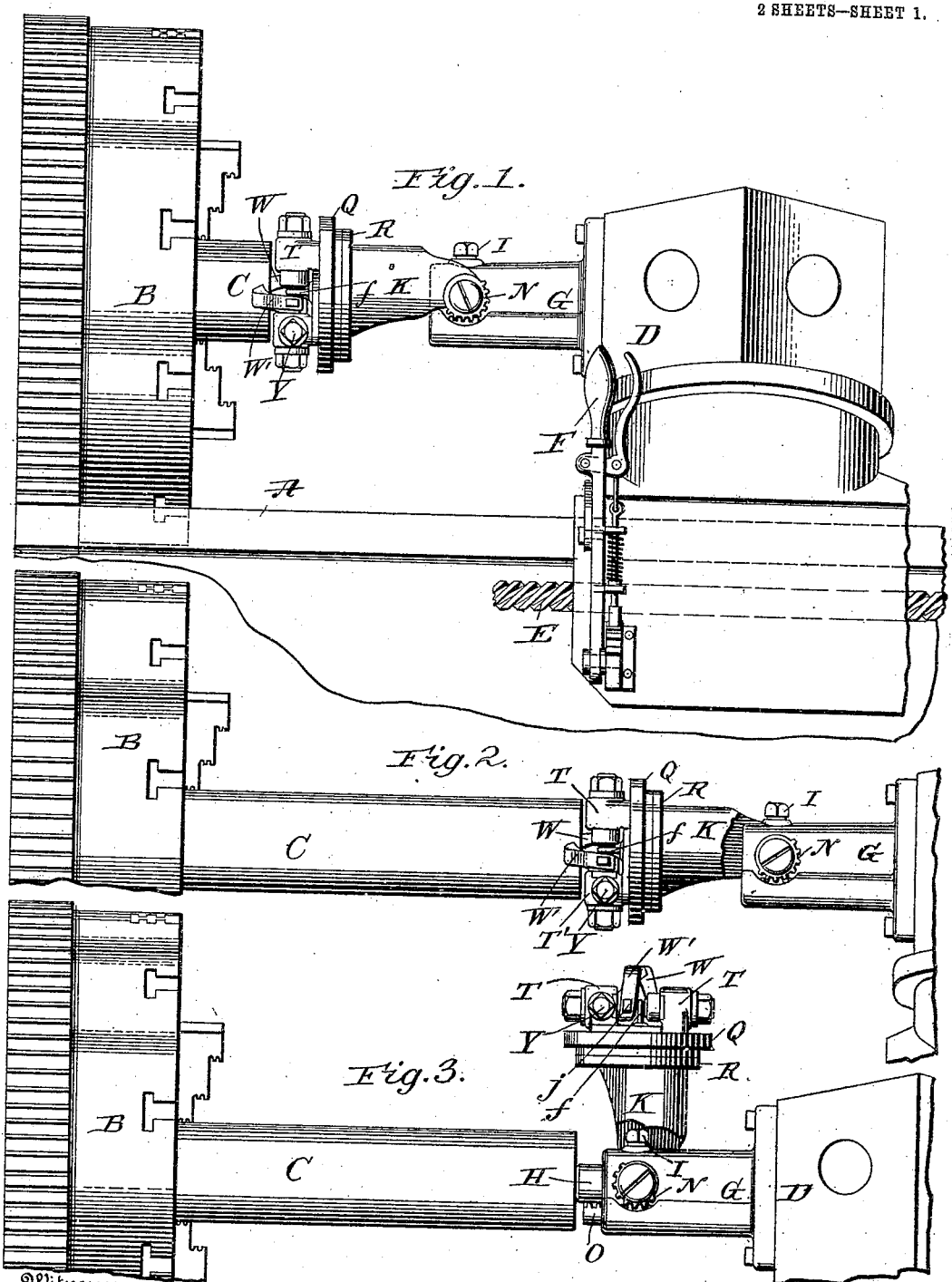

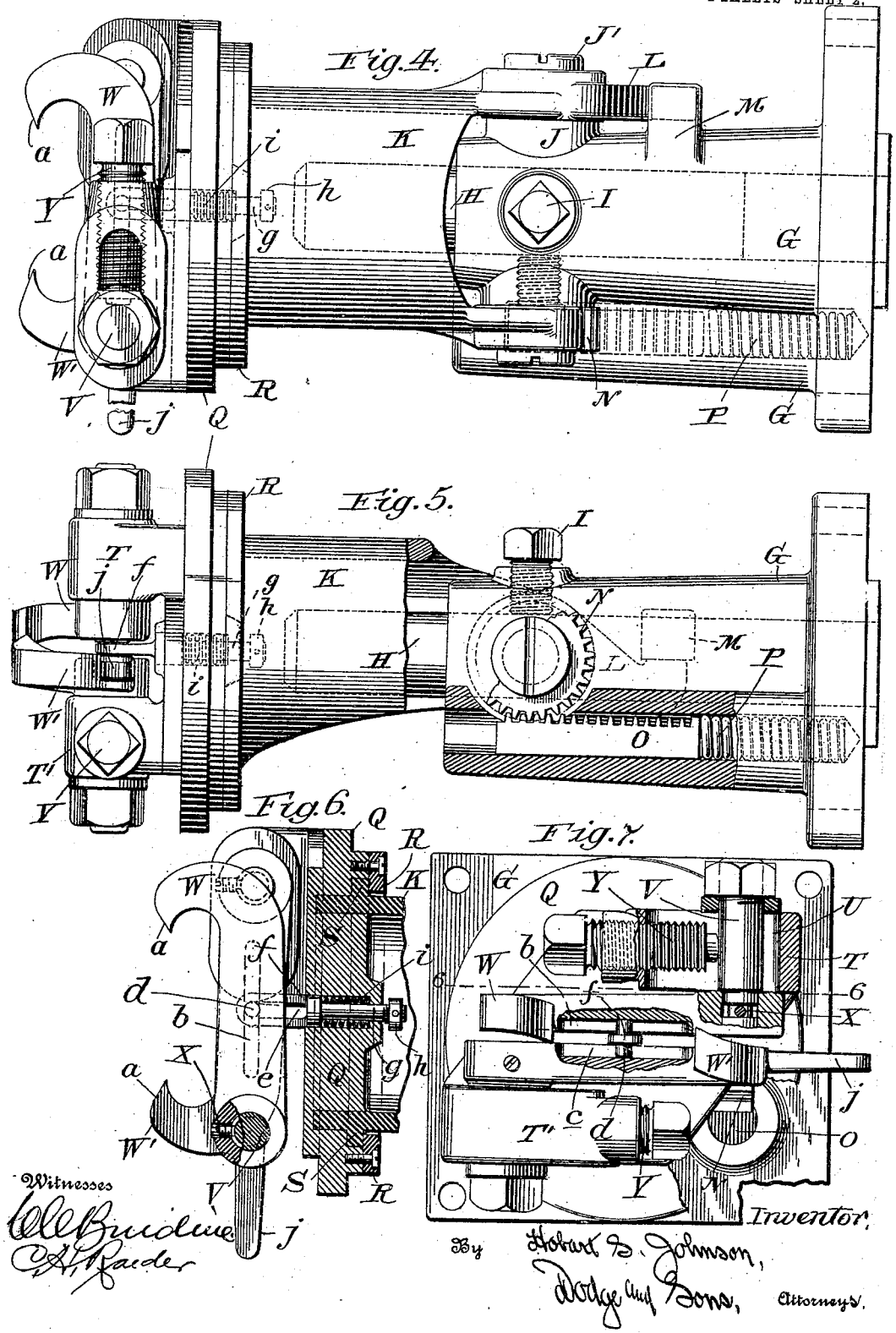

HOBART S. JOHNSON, OF MADISON, WISCONSIN, ASSIGNOR TO GISHOLT MACHINE COMPANY, OF MADISON, WISCONSIN, A CORPORATION OF WISCONSIN.

BAR-STOCK FEEDER FOR USE IN TURRET-LATHES, SCREW-MACHINES, AND THE LIKE.

932,394.   Specification of Letters Patent.   Patented Aug. 24, 1909.

Application filed December 15, 1906. Serial No. 347,993.

*To all whom it may concern:*

Be it known that I, HOBART S. JOHNSON, a citizen of the United States, residing at Madison, in the county of Dane and State of Wisconsin, have invented certain new and useful Improvements in Bar-Stock Feeders for Use in Turret-Lathes, Screw-Machines, and the Like, of which the following is a specification.

My present invention pertains to improvements in bar stock feeders for use in turret lathes, screw machines and the like, the construction and advantages of which will be hereinafter set forth, reference being had to the annexed drawings, wherein:

Figure 1 is a side elevation of the device, showing it as applied to a turret, and in the act of engaging and withdrawing the stock; Fig. 2 a similar view, the stock being withdrawn to a point slightly beyond that at which the work will be finally clamped by the chuck; Fig. 3 a like view, the jaw-carrying head being thrown up and the push or bunter-bar shown as bearing against the outer end of the stock, in position to move the stock rearwardly, or into the chuck to secure a final adjustment of the stock; Fig. 4 a top plan view of the device on an enlarged scale; Fig. 5 a side elevation thereof, parts being broken away and shown in section; Fig. 6 a horizontal sectional view on the line 6—6 of Fig. 7; and Fig. 7 a front elevation of the device, parts being shown in section.

The main object of my invention is to provide a simple and efficient stock-feeder, which may be employed in turret lathes, screw machines and the like. The construction is such that the engaging jaws may be adjusted to hold stock of different diameters, said jaws being mounted in such manner that they may engage and rotate with the stock.

The invention, for the purpose of illustration, is shown in connection with a turret lathe, the turret being traversed back and forth, as occasion requires, and under the control of the operator, by a suitable feed screw or the like. It is manifest that the device could be actuated by hand.

In the drawings, A denotes the lathe bed, B the chuck, C the stock or rod to be cut off in definite lengths, turned off, or otherwise manipulated; D the turret, E the feed screw therefor, and F the feed-controlling lever or handle.

Secured to one face of the turret is a base-piece or bracket G, provided with a central, longitudinally-disposed opening or recess in which is adjustably mounted a bunter or push-bar H, secured in place by tap screw or bolt I.

The bracket or base piece G is provided with laterally-projecting bosses J, which are tapped and threaded to receive screws J', said screws passing through the rearwardly-extending arms of a yoke or swing-piece K, and forming the pivots therefor. One of said arms is formed with a rearward extension or stop piece L, which when the swing piece is thrown down to its full extent, contacts with a lug M formed upon the bracket, thereby limiting the downward movement of the yoke or swing-piece. The opposite arm of the yoke piece has formed upon it, or is provided with, a series of teeth N, which mesh with the teeth of a rack-bar O, mounted and movable within a recess formed in the bracket G. A spring P, lying in rear of said rack-bar, serves to cushion the swing-piece or yoke and the attached parts when the same is swung downwardly, thus preventing breakage of the parts.

A head Q is swiveled upon the outer end of the swing-piece, the head being held in place by a ring R, secured to the face of the head in rear of a collar or annular flange S formed upon the swing-piece K.

The head is provided with two forwardly-extending lugs or ears T and T', disposed at opposite sides of the head and in different horizontal planes; in other words, being diagonally arranged. The lugs and attendant parts being duplicated, a description of one will suffice, the corresponding parts being denoted by the same reference letters, provided with an exponent or prime.

As will be seen upon reference to Figs. 4 and 7, lug T is provided with a vertically-disposed slot U through which extends a bolt or pivot-pin V, upon the lower end of which is swiveled a jaw W, said jaw being held in place by a screw X passing through the jaw and extending into a recess formed in the bolt. A screw Y is mounted in the lug or ear T at right angles to the bolt or pin V, bearing directly against said pin and serving to prevent lateral movement of the pin toward the center of the head.

The outer end of the jaw is inclined downwardly to a slight extent and provided with a sharp tooth or engaging member, the forward face of the jaw, as indicated at $a$, being beveled or inclined to facilitate the entrance of the stock between the jaws.

As will be noted upon reference to Fig. 5, the ends of the jaws are inclined inwardly, so that the jaws take a fair bearing at substantially diametrically opposite points on the stock.

Channels $b$ and $c$ are formed in oppositely-disposed faces of the main body of the jaws W and W', and a pin $d$ extends into said channels, the pin passing through a slot $e$ formed in the head $f$ of a spring-pressed plunger $g$ mounted in a socket or recess in the head Q. The reduced stem of said plunger $g$ passes through the head and is provided with a stop-nut $h$. Normally the spring $i$ serves to protrude the plunger and thus to throw the teeth of the jaws together.

One of the jaws, W', as shown in the drawings, will be provided with a releasing handle $j$ by which the jaws may be opened when it is desired to release the stock.

The operation of the device is as follows: Assuming that the pivot-pins or bolts V have been adjusted so that the jaws stand apart or separated to the necessary extent to engage the stock or bar C which is being manipulated and that the stock is in the position illustrated in Fig. 1, the operator will, by manipulation of lever F, cause the turret D with the stock-feeder to advance toward the chuck. The beveled faces $a$ of the jaws coming into contact with the stock will cause the jaws to open, putting spring $i$ under compression. When the jaws have passed over the end of the stock, lever F will be thrown to such position as will cause the turret to move to the right, the jaws automatically gripping the stock and drawing the same along. This traverse is continued until the stock is drawn out to the desired extent, or to a point beyond; the traverse lever is then brought to its neutral position and further withdrawal of the stock arrested. The jaws are then released from the stock by manipulation of handle $j$ and the swing-piece or yoke K thrown up to the position indicated in Fig. 3, spring P serving, in a measure, to maintain the parts in such position.

If the stock has been drawn out too far, the turret is caused to move to the left, the bunter-bar H coming into contact with the stock and pushing it back to the necessary extent. It will be readily appreciated that the extent of movement of the turret may be determined by a gage or by suitable stop mechanism.

By having the jaw-carrying head swiveled upon the yoke or swing-piece, the jaws may be brought into contact with the stock while it is still rotating. This is an important factor when the feeder is used in connection with an automatic chuck.

The term "bracket or base-piece" as applied to the member G is to be given a broad meaning in the generic claims, as it is evident that a suitable support for the swinging yoke will be employed according to the requirements of the particular case; the application of the feeder to a turret being but one of several ways in which the device may be mounted.

It is evident that, in so far as the automatically engaging jaws are concerned, they may be employed independently of the swing piece, the head being mounted upon a relatively fixed member, as a turret. So, too, under such arrangement the head may be swiveled. When such a construction is employed, the bunter bar would not be a direct part of the structure, but could, for instance, be carried by the turret, and, in fact, the bunter may be a separate member under any of the constructions.

Having thus described my invention, what I claim is:

1. In a bar stock feeder, the combination of a base piece; a member hinged to the outer end thereof and adapted to be swung into and out of alinement therewith; and a pair of gripping jaws mounted upon the forward end of said hinged member.

2. In a bar stock feeder, the combination of a base-piece; a member hinged thereto; a pair of gripping jaws mounted upon the forward end of the hinged member; and an adjustable bunter-bar carried by the base-piece.

3. In a bar stock feeder, the combination of a base piece; a member hinged adjacent to the outer end thereof and arranged to be swung into substantial axial alinement therewith; a pair of gripping jaws mounted upon said member; and means for normally holding said jaws in their closed position.

4. In a bar stock feeder, the combination of a base piece; a member hinged adjacent to the outer end thereof and adapted to be swung into and out of alinement therewith; a pair of gripping jaws pivotally mounted thereon; means for securing adjustment of said jaws toward and from each other; and means for normally holding the jaws in their closed position.

5. In combination with a support; a swing-piece or yoke carried thereby; a head swiveled thereon; and gripping jaws carried by said head.

6. In combination with a base or bracket;

a swing-piece hinged thereto; a head swiveled upon said swing-piece; gripping jaws mounted on the head; and a bunter-bar adjustably mounted in the forward end of the bracket.

7. In combination with a base or bracket; a bunter-bar extending outwardly from the forward end thereof; a swinging member pivotally secured to the bracket, the point of attachment being in rear of the forward end of the bunter-bar, whereby the swinging member may be thrown to one side of the bar; and gripping devices carried at the forward end of the swinging member.

8. In combination with a base or bracket; a bunter-bar extending outwardly from the forward end thereof; a stock-gripping device hinged to the bracket; and a cushioning device acting in conjunction with the hinged gripping device.

9. In combination with a base or bracket; an adjustable bunter-bar extending outwardly from the forward end thereof; a yoke hinged to the bracket; means for holding the yoke in alinement with the forward end of the bracket when the yoke is swung downwardly; and gripping devices carried by the forward end of the yoke.

10. In combination with a base or bracket; an adjustable bunter-bar extending outwardly from the forward end thereof; a yoke or swing-piece pivotally secured to the bracket; means for maintaining the yoke in alinement with the bracket when said yoke is swung downwardly; a head swiveled upon the bracket; a pair of lugs extending outwardly from said head; an adjustable pivot-pin mounted in each of said lugs; a gripping jaw carried by each of said pins; and a spring-actuated device serving to normally hold the jaws in their closed position.

11. In a bar stock feeder, the combination of a suitable support; rotatable gripping jaws rotatably and swingingly hinged thereon; and means for holding said jaws in a normally closed position.

12. In a bar stock feeder, the combination of a suitable support; gripping jaws carried thereby; and a bunter, adapted to act upon the stock when the jaws are released therefrom.

13. In a bar stock feeder, the combination of a suitable support; a member hinged to the outer end thereof and adapted to be swung into and out of alinement therewith; jaws carried by said member; and a bunter carried by the support and projecting forwardly therefrom, said bunter being covered by the hinged member when the hinged member is swung downwardly to bring the jaws into operative position.

14. In a bar stock feeder, the combination of a support; a swing piece or yoke carried thereby; a head swiveled thereon; gripping jaws carried by said head; and a bunter standing in alinement with the stock when the yoke is swung to one side.

15. In a bar stock feeder, the combination of a base piece; a member hinged thereto; a pair of gripping jaws mounted upon the forward end of the hinged member; and a bunter bar carried by the base piece.

16. In a bar stock feeder, the combination of a base piece; a member hinged adjacent to the outer end thereof and adapted to be swung into and out of alinement therewith; a pair of gripping jaws pivotally mounted thereon; and means for normally holding the jaws in their closed position.

17. In combination with a base or bracket; a swing-piece hinged thereto; a head swiveled upon said swing-piece; gripping jaws mounted upon the head; and a bunter bar mounted in the forward end of the bracket.

18. In combination with means for supporting bar stock; a base piece; a member hinged to the outer end of said base piece and adapted to be swung into substantial alinement with the stock; and a pair of gripping jaws mounted upon the forward end of said hinged member.

In testimony whereof I have signed my name to this specification in the presence of two subscribing witnesses.

HOBART S. JOHNSON.

Witnesses:
G. E. GERNON,
STANLEY C. HANKS.